United States Patent
Zobel et al.

(10) Patent No.: US 6,363,892 B1
(45) Date of Patent: Apr. 2, 2002

(54) COOLING SYSTEM, ESPECIALLY FOR A VEHICLE

(75) Inventors: Werner Zobel, Böblingen; Michael Ehlers, Nagold; Frank Vetter, Filderstadt; Jörg Soldner, Ehningen, all of (DE)

(73) Assignee: Modine Manufacturing Company, Racine, WA (US)

( * ) Notice: Subject to any disclaimer, the term of this patent is extended or adjusted under 35 U.S.C. 154(b) by 0 days.

(21) Appl. No.: 09/672,430

(22) Filed: Sep. 28, 2000

(30) Foreign Application Priority Data

Oct. 21, 1999 (DE) .......................................... 199 50 755

(51) Int. Cl.$^7$ ................................................. F01P 5/02
(52) U.S. Cl. ................................ 123/41.12; 123/41.51; 123/41.49
(58) Field of Search ........................... 123/41.65, 41.12, 123/41.49, 41.01, 41.51

(56) References Cited

U.S. PATENT DOCUMENTS

| | | | | |
|---|---|---|---|---|
| 4,202,296 A | * | 5/1980 | Nonnenmann et al. | 123/41.19 |
| 4,377,203 A | * | 3/1983 | Ejima | 123/41.44 |
| 5,522,457 A | | 6/1996 | Lenz | |
| 5,839,397 A | * | 11/1998 | Funabashi et al. | 123/41.49 |
| 6,164,909 A | * | 12/2000 | Ehlers et al. | 415/208.1 |

FOREIGN PATENT DOCUMENTS

| | | | |
|---|---|---|---|
| DE | 2716997 B2 | | 3/1979 |
| DE | 27 16 997 B2 | * | 3/1979 |
| DE | 3148942 C2 | | 12/1983 |
| DE | 19724728 A1 | | 2/1999 |
| DE | 1045217 A1 | | 10/2000 |

* cited by examiner

Primary Examiner—Marguerite McMahon
Assistant Examiner—Jason Benton
(74) Attorney, Agent, or Firm—Wood, Phillips, VanSanten, Clark & Mortimer

(57) ABSTRACT

Fan efficiency problems are substantially reduced in a cooling system having a plurality of heat exchangers (10), (18), (20), (22) positioned with respect to each other to define a housing in the form of a polygonal solid with certain of the heat exchangers being employed in heat exchange fluid while others may be utilized to cool one or more other heat exchange fluids different from the first. A radial fan (42) is disposed within a space (26) within the housing and provided with blades (52) for flowing air generally radially outward through the heat exchangers (10), (18), (20), (22). The ratio of the location of the center line (d) of the fan blade outer edges (56) with respect to the front (30) of the heat exchanger to the diameter (D) of the fan (42) at the outer edges (56) is in the range of about 0.20 to about 0.36.

10 Claims, 3 Drawing Sheets

COOLING SYSTEM, ESPECIALLY FOR A VEHICLE

FIELD OF THE INVENTION

This invention relates to cooling systems, and more particularly, to cooling systems for utilization on vehicles where plural, different heat exchange fluids require cooling.

BACKGROUND OF THE INVENTION

So-called "compact cooling systems", especially for vehicular applications, are being investigated at an ever increasing rate. Typically, they have several heat exchangers which are positioned to define a housing. Within the housing thus defined is the impeller of a radial fan. The front of the housing is closed but includes an inlet nozzle facing the impeller and the rear wall of the housing is also closed. The impeller draws fresh air into the housing through the nozzle and expels the same radially outwardly, as cooling air, through each of the heat exchangers. Typically, the rear wall of the unit provides a journal for the impeller. Certain of the heat exchangers may be devoted to cooling the coolant of an internal combustion engine while another may be utilized to cool combustion air from the engine after it has had its pressure increased by a turbocharger or the like. Still another may be utilized as a condenser or gas cooler in an air conditioning system for the vehicle and still another may be utilized as an oil cooler for oil in vehicular systems that requires cooling, particularly, transmission oil.

One example of such an apparatus is described in European Patent Application No. 9910760.9, the entire disclosure of which is herein incorporated by reference.

Other apparatus with some similar features are also shown in U.S. Pat. No. 4,202,296 and German Patent 3148942C2. The apparatus of the two identified patents do not relate to casing-like configurations as alluded to above wherein several individual cooling units are employed. Rather, they relate to so-called "ring-type" cooling units which are more expensive to produce and consequently have not seen wide spread use as of the present. In the case of both, radial fans rotatable about a vertical axis have been employed but such a position is not particularly advantageous in terms of the efficiency of the fan.

Still another example of a ring-type cooling unit is shown in German Patent DE AS2716997 which does have the advantage of cooling several different cooling mediums. However, the cost of manufacturing a cooling system according to this patent is quite expensive.

Radial fans used in these type of apparatus, in which the ratio of the diameter of the inlet nozzle to the diameter of the impeller lies approximately between 0.6 and 0.9, are relatively quiet and have a compact design. See, for example, the text "Ventilators", 5th Edition, 1972, page 151 by Dr. Bruno Eck. Radial fans are, of course, also subject to other operational parameters. For example, a certain optimal width of the impeller can be coordinated with a certain diameter of the inlet nozzle. During the operation of radial fans, so-called "aperture flow" occurs between the nozzle and the cover plate of the impeller. The magnitude of such flow is dependent upon the formation of the aperture or in-flow nozzle and may have the result that an area of lower pressure is formed in the area of the cover plate for the impeller. This encourages flow from areas of higher pressure and reduces performance, particularly if air is drawn as a back flow through one or more of the heat exchangers.

The present invention, then, is intended to provide an improvement in cooling apparatus of the foregoing type insofar as the efficiency of the apparatus is concerned.

SUMMARY OF THE INVENTION

It is the principal object of the invention to provide a new and improved cooling system, particularly for a vehicle. More particularly, it is an object of the invention to provide a so-called compact cooling system wherein a plurality of heat exchangers are arranged to create a housing in which a radial fan is disposed and losses due to aperture flow and other inefficiencies are minimized or avoided altogether.

An exemplary embodiment of the invention achieves the foregoing object in a cooling system that includes a plurality of at least three heat exchangers, each having two headers, and in proximity to each other. The heat exchangers are positioned to define a housing in the form of a polygonal solid and with the headers of one heat exchanger being in substantial abutment with the respective header of two different, adjacent heat exchangers. At least one of the heat exchangers is adapted to receive a first heat exchange fluid different from a second heat exchange fluid that is received by at least one of the other heat exchangers. A radial fan rotatable about an axis and having an impeller disposed within the housing as provided. The impeller includes blades for flowing air generally radially outward through the heat exchangers. A front panel is located on the housing and includes an inlet nozzle coaxial with the axis and focused on the impeller. A rear panel is also located on the housing and a shaft extends rearwardly from the rear panel along the axis and is coupled to the impeller. A journal for at least one of the impeller and the shaft to provide the desired rotation about the axis is provided. The system is characterized by the fact that the center line of the radially outer part of the blades taken in a plane transverse to the rotational axis is located between the front panel and the center line of the housing. It is further characterized by the ratio of the distance from the front panel to the center line of the blades to the diameter of the impeller at the radially outer part of the blades being in the range of about 0.20 to about 0.36.

In a preferred embodiment, at least two of the heat exchangers are radiators and the first fluid is a coolant for an internal combustion engine.

A preferred embodiment of the invention also contemplates that one of the heat exchangers is a charge air cooler and the second fluid is combustion air for an internal combustion engine.

According to one embodiment of the invention one of the heat exchangers is a gas cooler and the second fluid is a refrigerant for an air conditioning system.

Still another embodiment of the invention contemplates that one of the heat exchangers is an oil cooler and the second fluid is oil.

In a highly preferred embodiment, the ratio is in the range of about 0.25 to about 0.32.

In a highly preferred embodiment, the blades curve rearwardly in the direction of rotation of the impeller.

A preferred embodiment of the invention contemplates that the rear panel has a number of corners equal to the number of heat exchangers and a plurality of support struts, each extending from a respective one of the corners towards the axis. Connection plates are located at each of the corners and at least one fluid port is located in at least two of the connection plates. Flow channels, including a fluid inlet and a fluid outlet, are connected to the fluid ports.

In one embodiment, the flow channels are mounted on the rear panel.

A preferred embodiment also contemplates that the rear panel have a central convex section centered about the axis and extending inwardly into the housing.

Other objects and advantages will become apparent from the following specification taken in connection with the accompanying drawings.

DESCRIPTION OF THE PREFERRED EMBODIMENT

It is to be noted that the following description of the invention refers to the environment of vehicular applications. However, no limitation to vehicles is intended except insofar as expressed in the appended claims. For example, the system may be utilized with efficacy in connection with internal combustion engine system cooling systems or stationery applications as, for example, electrical generators. Moreover, the same may be used in non-internal combustion engine applications where there is a need for a single cooling unit to provide cooling for multiple, non-compatible fluids that require cooling.

With the foregoing in mind, an exemplary embodiment of the invention will now be described.

Figure 1:
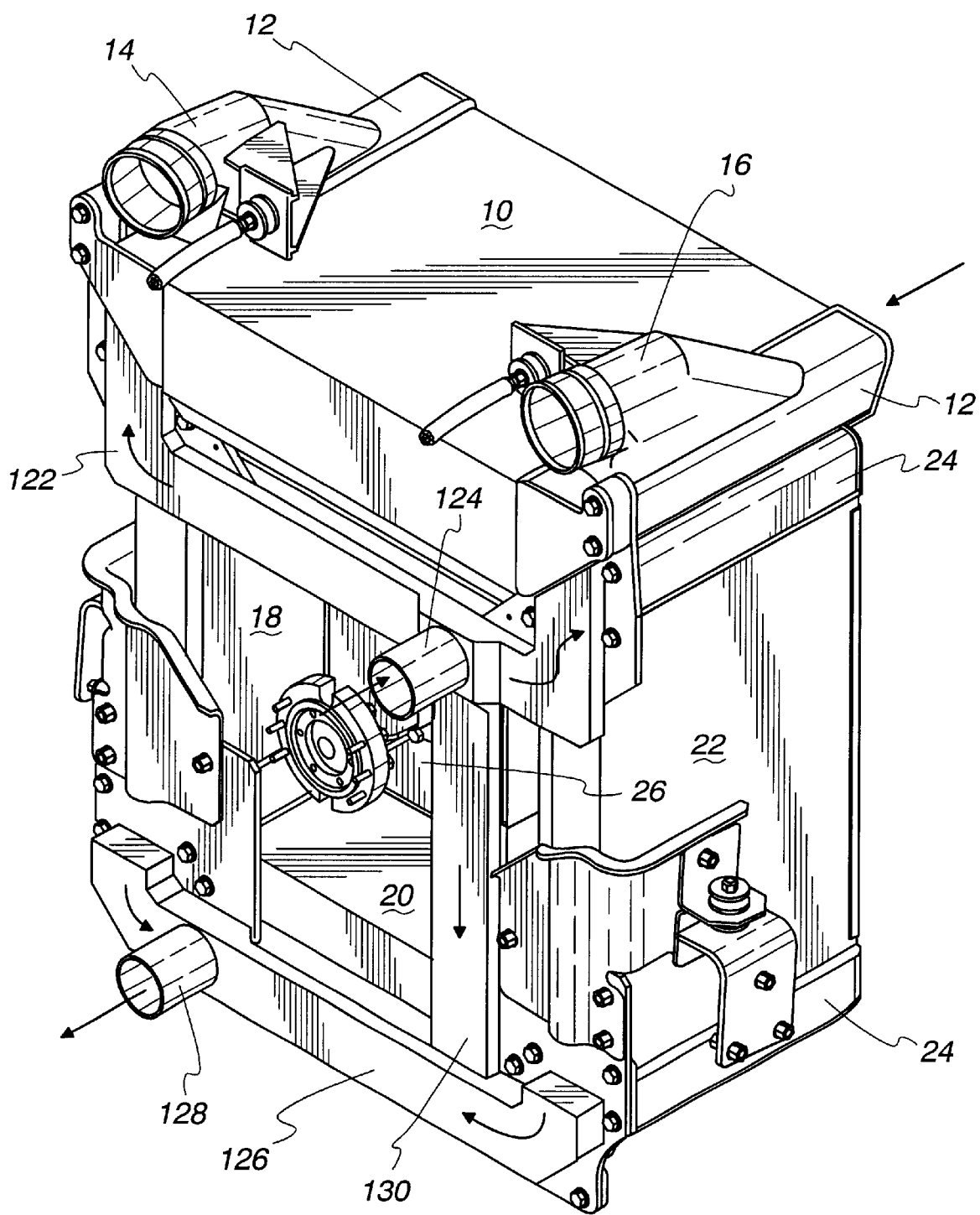
FIG. 1 is a perspective view of a cooling system made according to the invention taken from the rear thereof.

Referring to FIG. 1, an exemplary embodiment of a cooling system made according to the invention is illustrated. The same includes a heat exchanger 10 having headers 12 at opposite ends thereof and which may be a so-called charge air cooler. As is well known, a charge air cooler is typically used to cool combustion air for an internal combustion engine after the same has had its pressure elevated above atmospheric by a turbocharger or the like. To this end, the charge air cooler 10 includes an inlet 14 which may be connected to the outlet of a turbocharger or the like and an outlet 16 which may be connected to the intake manifold for the internal combustion engine. The inlet 14 and outlet 16 are connected to respective ones of the headers 12.

The cooling system also includes three additional heat exchangers 18, 20 and 22. In the preferred embodiment, each of the heat exchangers 18, 20, 22 are radiators for cooling coolant from an internal combustion engine. However, it is to be understood that in many cases, only two of the heat exchangers, 18, 20, 22 will be used for this purpose. Thus, while in some instances, all three may be used as radiators, in other instances, one of the heat exchangers, such as the heat exchanger 20, may be used as an oil cooler for cooling oil employed in the internal combustion engine system, particularly transmission oil. Alternatively, the heat exchanger 20 may be utilized as a gas cooler to cool or condense a refrigerant used in the air conditioning system of the vehicle.

In this regard, while four of the heat exchangers 10, 18, 20, 22 are illustrated, a greater or lesser number may be employed. In any event, it is seen that the heat exchanger 22 has opposed headers 24 with one of the headers 24 being closely adjacent to one of the headers 12 of the heat exchanger 10. The other header 24 will be closely adjacent a header (not shown) of the heat exchanger 20. Another header of the heat exchanger 20 may be closely adjacent a header of the heat exchanger 18 and the remaining header of the heat exchanger 18 will be adjacent to the header 12 connected to the inlet 14 for the heat exchanger 10. In the usual case, the headers will be abutted to prevent air flow through the interface of two headers. As the heat exchangers 10, 18, 20, 22 will typically be rectangular in outline, a polygonal solid, specifically a rectangular solid, is formed to define a housing having a generally open center 26.

Figure 3:
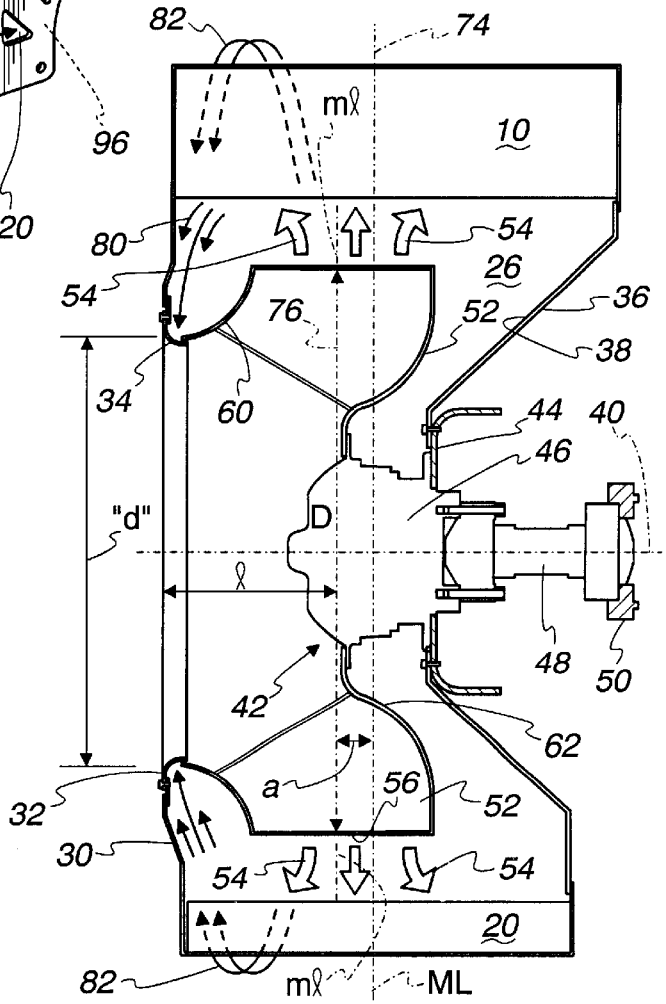
FIG. 3 is sectional view of a cooling system made according to the invention.

With reference to FIG. 3, the front side of the unit is closed by a front panel 30 which is provided with a central, circular opening 32 in which an inlet nozzle 34 is disposed.

Also provided is a rear panel 36 which closes the rear of the housing defined by the heat exchangers.

The rear panel 36 includes a convex formation 38 which is centered on the rotational axis 40 of a radial discharge fan, generally designated 42. The convex formation 38 extends inwardly into the housing, that is, into the space 26 and includes a mounting plate 44 which mounts a journal shown schematically at 46 which will typically be a roller bearing or the like. The journal 46 is centered on the rotational axis 40 as is a shaft 48 which includes a coupling 50 by which the shaft 48 may be coupled to a source of rotary power such as an electrical motor or to the rotational output of an internal combustion engine. Within the housing or space 26, the shaft 48 mounts an impeller hub, generally designated 42, of a radial discharge fan. A plurality of blades 52 are mounted on the hub 42 and are arranged to discharge air entering the inlet opening 32 in a generally radial direction as shown by arrows 54. Thus, inlet air is discharged by the blades 52 from the radially outer edges 56 in the direction of the arrows 54 through the heat exchangers 10, 18, 20, 22.

Figure 5:
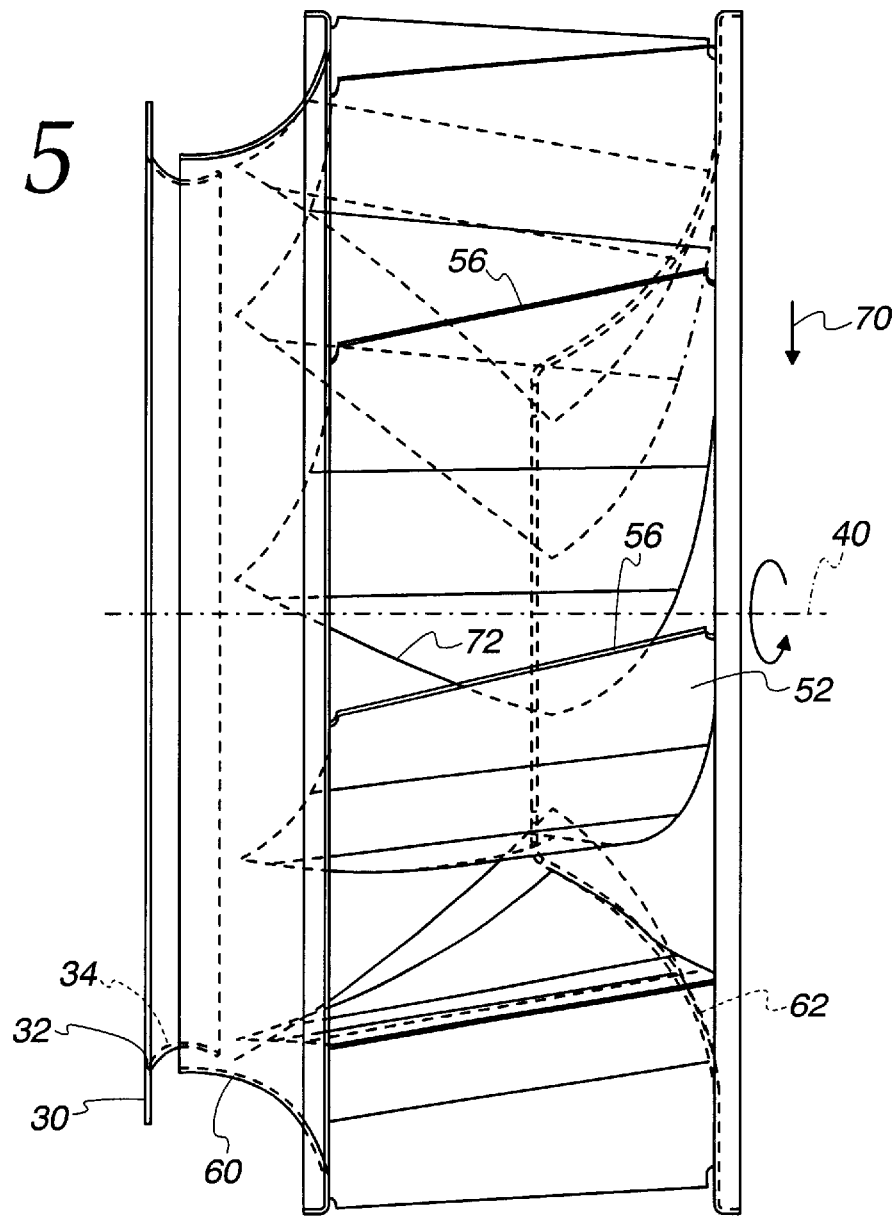
FIG. 5 is a view illustrating the position of blades on the impeller in relation to front and rear panels of the system as well as a wall employed in a radial fan.

Preferably, the blades 52 carry a front fan shroud 60 and a rear fan shroud 62 which causes all of the inlet air to be discharged off of the radially outer edges 56. As can be seen in FIG. 5, the blades 52 are curved rearwardly or backwardly with relation to the direction of fan rotation which, in FIG. 5, would appear to be in a downward direction shown by an arrow 70. That is to say, the radially outer edges 56 of the blades pass through any given plane encompassing the axis of rotation 40 after the root edges 72 of the corresponding blade pass through such plane.

Returning to FIG. 3, it will be seen that a center line of the face 26 of the housing is given the reference numeral 74 while the center line of the impeller 42 is given the reference numeral 76. The center line 74 is taken approximately midway between the sides of the narrowest one of the heat exchangers in the array, here, the heat exchanger 20. The center line 76 is taken through the midpoint of the radially outer edges 56 of the blades on the impeller and it will be seen that the same is spaced from the housing midpoint line 74 in the direction of the inlet opening 32 a distance designated as "a". That is to say, the center line 76 is closer to the inlet 32 than the center line 74.

It will also be observed from FIG. 3 that the distance between the center line 76 of the blades 52 and the inlet 32 is designated "l".

Figure 4:
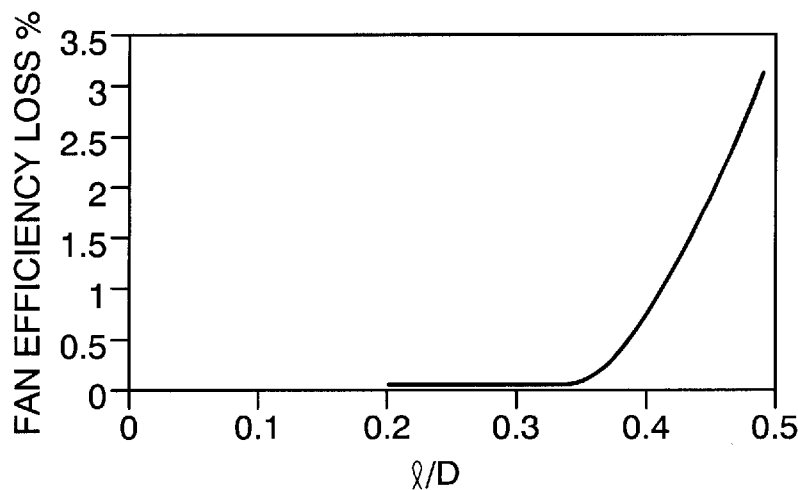
FIG. 4 is a graph depicting reduction in efficiency plotted against a ratio indicative of the position of the impeller.

Moreover, the diameter of the impeller 42 taken at the center line 76 is designated "D" while the diameter of the opening or inlet 32 is designated "d". In the illustrated embodiment, the ratio of l/D amounts to 0.30. In a highly preferred embodiment of the invention, this ratio will be between about 0.20 and about 0.36. Even more preferably, it will be between 0.25 and 0.32. It has been found that values within this range reduce aperture flow, that designated by arrows 80, and the resulting reverse flow through the heat exchangers, such as indicated by arrows 82, is substantially reduced. FIG. 4 plots the efficiency loss of the fan (in percent) over a wide range of l/D ratios. As can be seen, the loss is small and fairly constant from about 0.20 up to about 0.36, at which time, there is a steep rise in the curve as the undesired reverse flow, which impedes efficiency, is greater. Stated in other terms, undesirable reverse flow continues to grow undesirably large the greater the l/D ratio or the further that the impeller 42 is moved rearwardly within the space 26.

Figure 2:
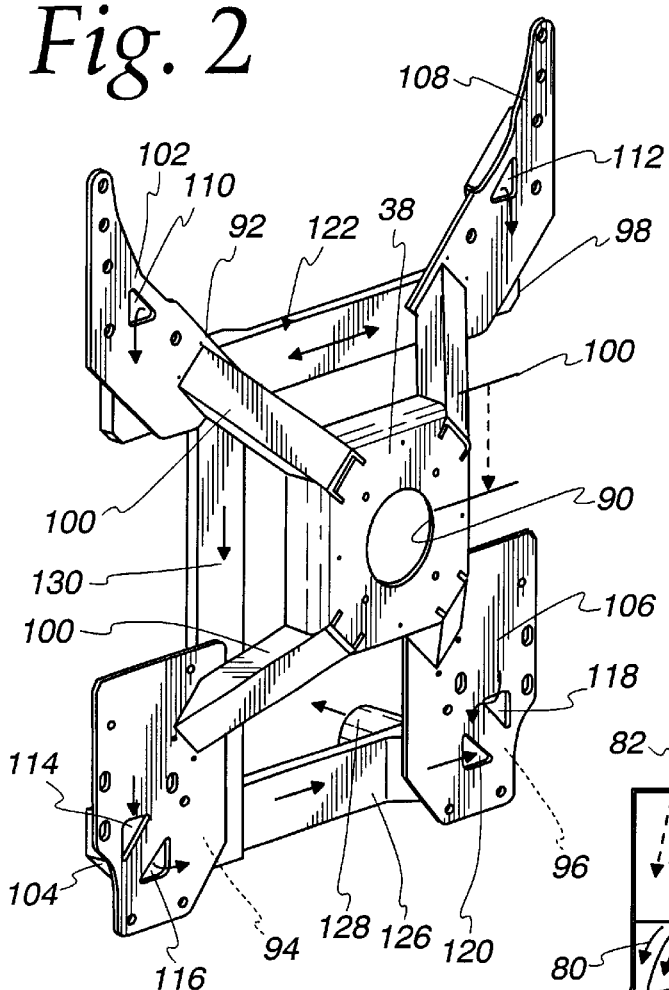
FIG. 2 is a perspective view of a rear panel employed in the cooling system taken from the front of the rear panel.

Returning to FIG. 1 and with reference to that figure as well as FIG. 2, the rear panel 36 will be described in greater detail. The convex part 38 of the rear panel 36 is seen to include a central opening 90 which is located on the rotational axis 40 (FIG. 3) of the shaft 48. This opening receives and mounts the journal 46 for the impeller 42. The rear panel has four corners shown at 92, 94, 96 and 98, one for each heat exchanger in the array. These corners 92, 94, 96, 98 align with the junction whereat respective ones of the heat exchangers 10, 18, 20 and 22 have an interface between the respective headers 12, 24, etc. From these corners, struts 100 extend radially inward to mount, in a structurally secure fashion, the convex part 38 of the rear panel. Between each of the struts 100, closure panels (not shown for clarity) are located to prevent air from entering and exiting the space 26 at the rear panel 36.

In each of the corners 92, 94, 96, 98, connection plates 102, 104, 106, and 108 are located respectively. These connection plates serve as a means by which the heat exchangers 10, 18, 20, 22 are mounted to form the unit illustrated in FIG. 1. In addition, both of the upper connection plates 102, 108, include a single fluid port 110, 112 while the connection plates 104, 106 include two fluid ports 114, 116; 118, 120. As seen in FIG. 2, these ports are triangular in configuration as it is preferred to make the headers 12, 24 triangular in cross-section so as to nest tightly in the configuration illustrated in FIG. 1. As illustrated, the port 110 will be in fluid communication with the upper header 24 for the heat exchanger 22 while the port 112 will be in fluid communication with the upper header (not shown) for the heat exchanger 18. Regarding the lower connection plates 104, 106, the port 114 will be in fluid communication with the lower header 24 for the heat exchanger 22 as well as the adjacent header (not shown) for the heat exchanger 20. Similarly, the port 118 will be in fluid communication with the lower header of the heat exchanger 18 and the port 120 will be in fluid communication with the adjacent header of the adjacent heat exchanger 20 (not shown).

A flow conduit or channel 122 interconnects the ports 110, 112 and is mounted on the rear panel 36 of the unit. The flow channel 122 includes a coolant inlet 124 which typically will be connected to the coolant outlet of an internal combustion engine. A lower flow channel 126 interconnects the ports 114, 118 and includes an outlet 128 for coolant which will typically be connected to the coolant inlet for an internal combustion engine. Where the heat exchangers 18 and 22 are employed as radiators and the heat exchanger 20 is also a radiator, a further flow channel 130 arranged in the vertical direction will interconnect the flow channel 122 and the port 116 while the port 120 may be connected to the flow channel 126. Alternatively, if the heat exchanger 20 is used for another purpose, as, for example, a gas cooler or oil cooler, then, of course, the ports 116, 120 may be connected directly to the transmission oil cooling system, or the refrigeration system and the flow channel 130 omitted entirely.

It is to be particularly observed that the flow channels 126, 130, like the flow channel 122 are connected to the rear panel 36 and, in addition to the struts, 100 serve to strengthen the same by providing additional structural support for the components of the rear panel 36. They also provide additional support for the fan components identified earlier.

From the foregoing, it will be appreciated that a cooling unit made according to the invention is ideally suited for vehicular applications where space is limited but may be employed in other applications with efficacy as well. The unique location and geometry of the fan with respect to the inlet reduces undesirable back flow to a point where fan efficiency is maximized to provide a highly efficient cooling unit as well.

We claim:

1. A cooling system, particularly for a vehicle, comprising:

a plurality of at least three heat exchangers, each having two headers and in proximity to each other and positioned to define a housing in the form of a polygonal solid and with the headers of one heat exchanger being in substantial abutment with a respective header of two different, adjacent heat exchangers, at least one of said heat exchangers being adapted to receive a first heat exchange fluid different from a second heat exchange fluid received by at least one other heat exchanger;

a radial fan rotatable about an axis and having an impeller within said housing and provided with blades for flowing air generally radially outward through said heat exchangers;

a front panel on said housing including an inlet nozzle coaxial with said axis and focused on said impeller;

a rear panel on said housing;

a shaft extending rearwardly from said rear panel along said axis and coupled to said impeller; and a journal for at least one of said impeller and said shaft to provide for said rotation about said axis; and characterized by the center line of the radially outer part of said blades taken in a plane transverse to said axis being located between said front panel and the center line of said housing and the ratio of the distance from said front panel to said center line of said blades to the diameter of said impeller at the radially outer part of said blades is in the range of about 0.20 to about 0.36.

2. The cooling system of claim 1 wherein at least two of said heat exchangers are radiators and said first fluid is a coolant for an internal combustion engine.

3. The cooling system of claim 2 wherein one of said heat exchangers is a charge air cooler and said second fluid is combustion air for an internal combustion engine.

4. The cooling system of claim 2 wherein one of said heat exchangers is a gas cooler and said second fluid is a refrigerant.

5. The cooling system of claim 2 wherein one of said heat exchangers is an oil cooler and said second fluid is oil.

6. The cooling system of claim 1 wherein said ratio is in the range of about 0.25 to about 0.32.

7. The cooling system of claim 1 wherein said blades curve rearwardly in relation to the direction of rotation of said impeller.

8. The cooling system of claim 1 wherein said rear panel has a number of corners equal to the number of heat exchangers and a plurality of support struts each extending from a respective one of said corners toward said axis; connection plates at each of said corners; at least one fluid port in at least two of said connection plates; and flow channels, including a fluid inlet and a fluid outlet, connected to said fluid ports.

9. The cooling system of claim 8 wherein said flow channels are mounted on said rear panel.

10. The cooling system of claim 1 wherein said rear panel includes a central convex section centered about said axis and extending inwardly into said housing.

* * * * *